J. PAUL.
SAFETY BOLT AND NUT.
APPLICATION FILED MAY 24, 1917.
1,287,415.
Patented Dec. 10, 1918.
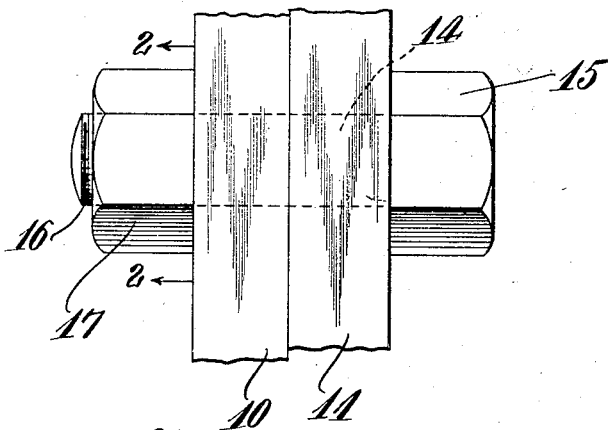
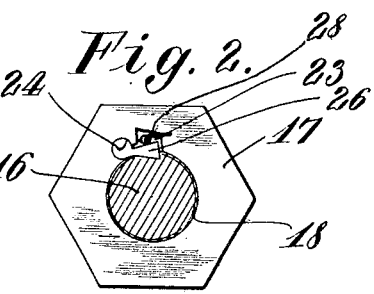
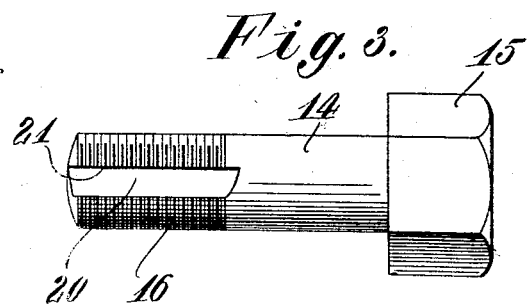
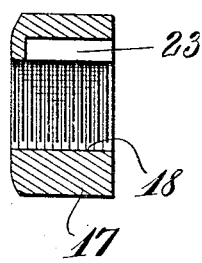
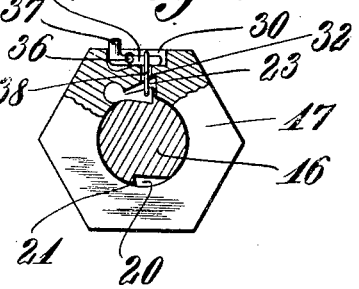
Inventor
James Paul.
By his Attorney
Oscar Geier

UNITED STATES PATENT OFFICE.

JAMES PAUL, OF CAMBRIDGE, OHIO.

SAFETY BOLT AND NUT.

1,287,415.  Specification of Letters Patent.  Patented Dec. 10, 1918.

Application filed May 24, 1917.  Serial No. 170,645.

*To all whom it may concern:*

Be it known that I, JAMES PAUL, a subject of the King of Hungary, resident of Cambridge, county of Guernsey, and State of Ohio, have invented certain new and useful Improvements in Safety Bolts and Nuts, of which the following is a specification.

This invention relates to improvements in nut locks, and has as its special object the provision of means whereby a screw-threaded article, as a bolt, may be engaged with its nut in such manner as to be prevented from loosening or turning in the opposite direction therein.

A further object is to provide such devices in forms which are cheap to construct, easy to operate, and efficient in their action.

These and other like objects are attained by the novel construction and combination of parts hereafter described and shown in the accompanying drawing, forming a material part of this disclosure, and in which:—

Figure 1 is a side elevational view showing an application of a bolt and nut.

Fig. 2 is a transverse sectional view taken substantially on line 2—2 of Fig. 1.

Fig. 3 is a side elevational view of a bolt made in accordance with the invention.

Fig. 4 is a sectional view taken through the center of a nut.

Fig. 5 is a perspective view of the locking device or key as applied within the nut to the bolt, and Fig. 6 is a transverse sectional view taken substantially in the same position as that of Fig. 2, but showing a modification in construction.

In the drawings, the two parts held together are represented by the numerals 10 and 11, through which is an opening receptive of the bolt shank 14, provided with the usual octagonal head 15, and with a screw-threaded end 16, engageable with which is a nut 17 having the general aspect of a common nut, and provided with an internal screw-thread 18, to which the threaded portion 16 of the bolt is fitted.

One or more longitudinal slots 20 are formed in the bolt, the same extending the entire length of the threaded portion and preferably having an abrupt shoulder 21 upon one side, the opposite edge of the cut extending out through the top of the thread tangentially to the bolt.

Extending into the nut 17 is a longitudinal recess 23, the main part of which is formed with a straight cut tangential to the bore of the nut, and leading thereto is a circular recess 24, the latter being suited to receive the semi-cylindrical stem portion 25 of the keeper 26, the same being substantially wedge-shaped and suited to enter the slot 20 of the bolt and recess 23 in the manner clearly indicated in Fig. 2, the keeper 26 being pressed into operative position by the spring 28.

In operation, the parts being assembled in the manner indicated and the bolt screwed to its seat, the keeper 26 having been placed in position, it will allow the bolt to be turned in the direction to tighten the same, but when the bolt is turned in a reverse direction, that is to release or loosen the same, the thickened edge 27 of the wedge shaped portion comes against the shoulder 21, preventing it from turning.

In the adaptation shown in Fig. 6, the same conditions are observable and the same parts used, with the addition that the nut 17 is provided with a recess 30, from which extends an opening or passage 32 into the recess 23, a bell-crank lever 35 being pivoted in the recess 30 upon the pin 36, and having an outstanding portion 37, raised slightly above the exterior of one of the flat faces of the nut, while connected with the bell-crank lever is a link 38 in such manner that when a wrench is applied to the nut, the extending portion 37 of the lever is depressed, tending to draw out the link 38 and with it the wedge-shaped portion 26 of the keeper, thereby permitting the lock to be turned oppositely to the direction which would tighten the same. The same effect can obviously be produced by pressing in the portion 37 in any other convenient manner.

From the foregoing, it will be seen that a very simple device which effectually fulfils its purpose has been disclosed, and that the same can be applied to bolts and nuts of the ordinary kind without any material change in their exterior formation.

Having thus described my invention, what I claim as new, and desire to secure by Letters Patent, is:—

In combination, a threaded bolt-shank having a plurality of longitudinal slots, a nut threadedly mounted upon the threaded bolt, said nut being formed with a substantially-rectangular recess having a concave sunken end, a pivot spanning said recess, a bell-crank lever pivoted upon said pivot and having one arm resting upon the bottom of said recess and its opposite arm projecting outwardly of said recess and adapted to be depressed into said sunken cavity in order to raise the first-named arm, said nut also having a passage at right angles to said recess and communicating therewith, the opening of said nut being formed with a jagged extension intersecting the plane of said passage, and a circular recess at the point of said jagged extension, a dove-tailed-shaped keeper adapted to ride in said jagged extension and having a semi-cylindrical stem disposed in said circular recess, and a link connecting said keeper and said bell-crank lever and adapted to project said keeper into any of the bolt slots and to release the same therefrom.

In testimony whereof I have affixed my signature.

JAMES PAUL.

Copies of this patent may be obtained for five cents each, by addressing the "Commissioner of Patents, Washington, D. C."